Sept. 22, 1942.       R. M. MAGNUSON            2,296,644
                    CRANKSHAFT OILING SYSTEM
                    Filed April 28, 1941         3 Sheets-Sheet 3
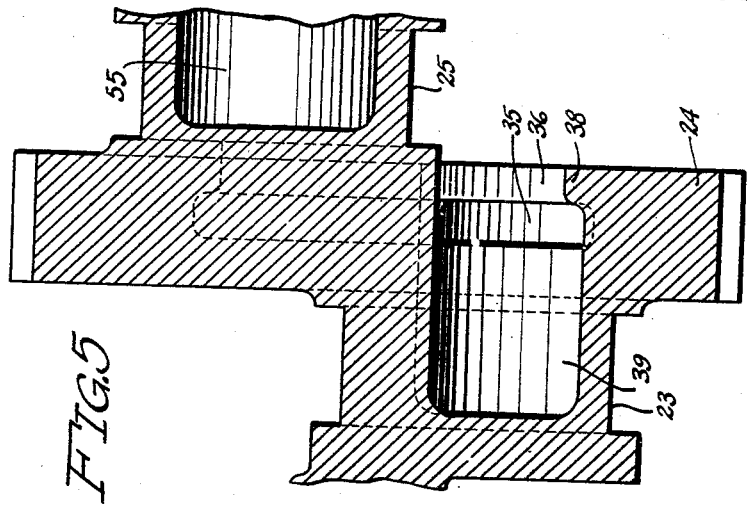
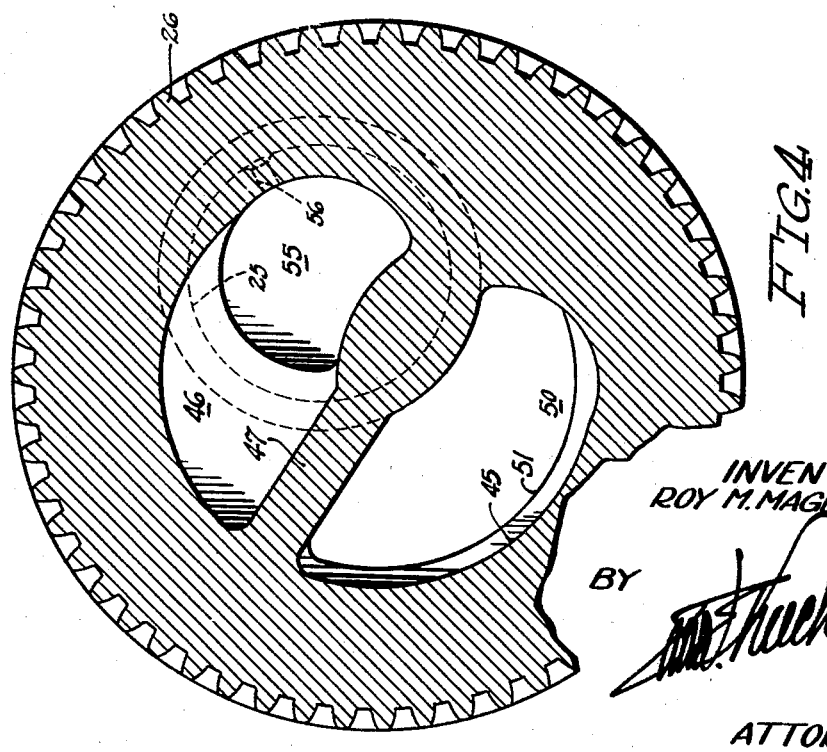
INVENTOR:
ROY M. MAGNUSON
BY
ATTORNEY Patented Sept. 22, 1942

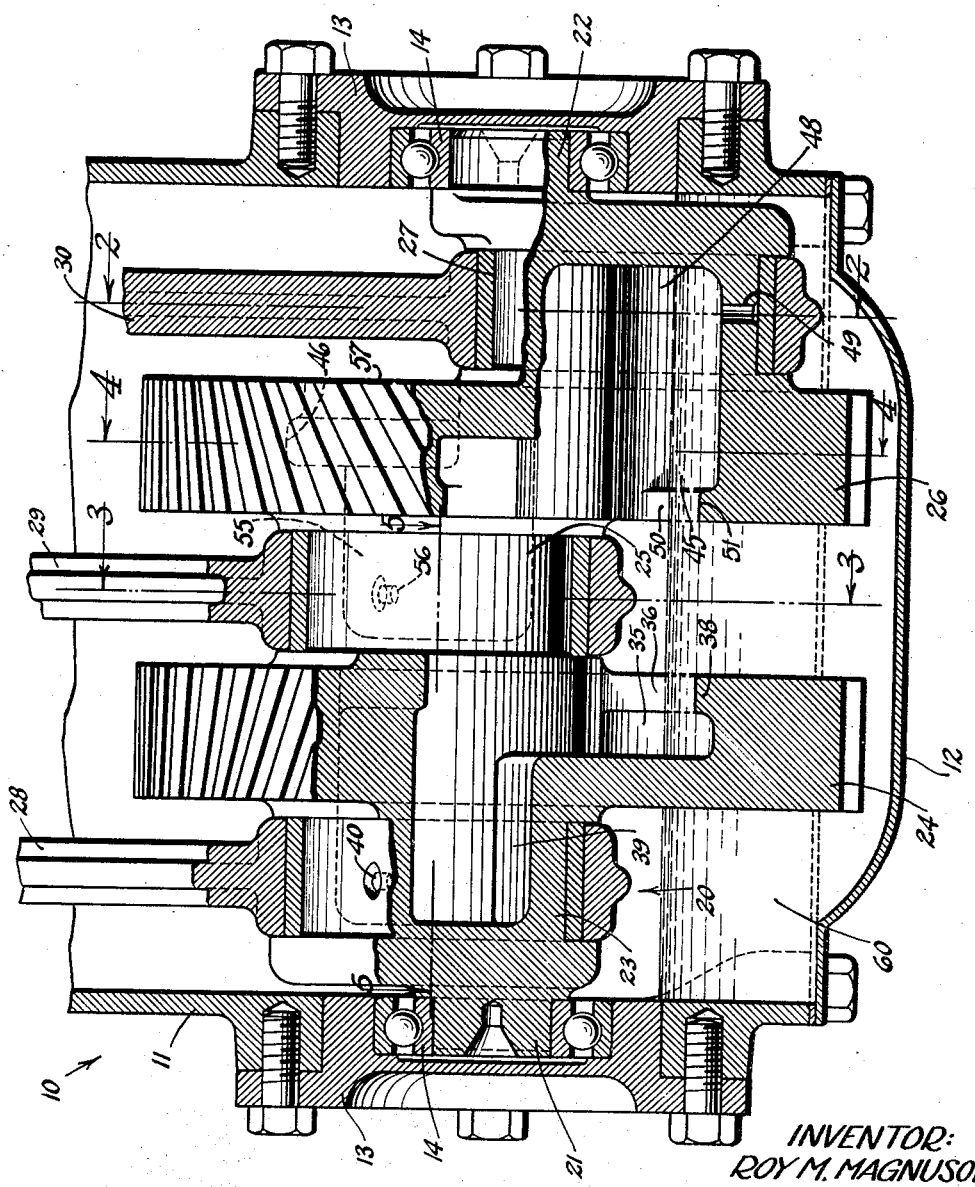

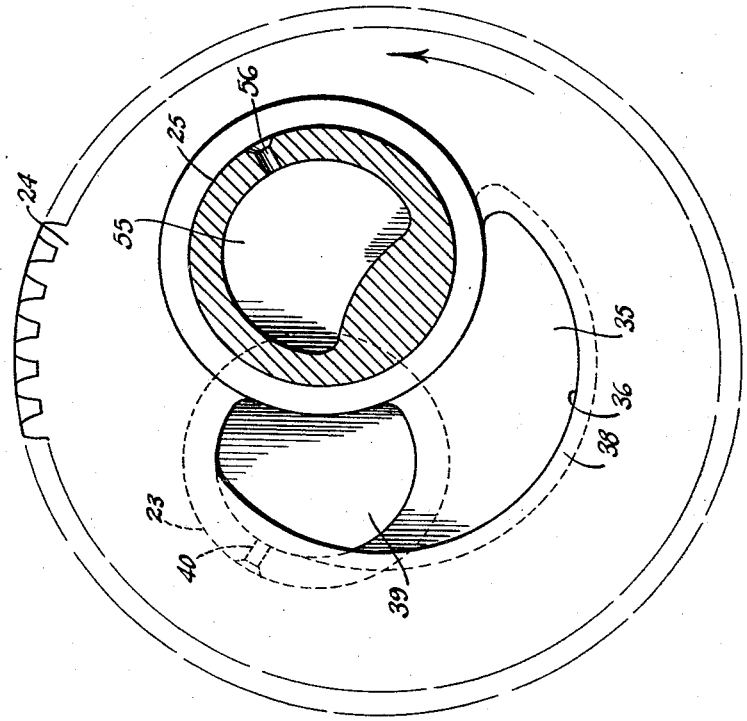
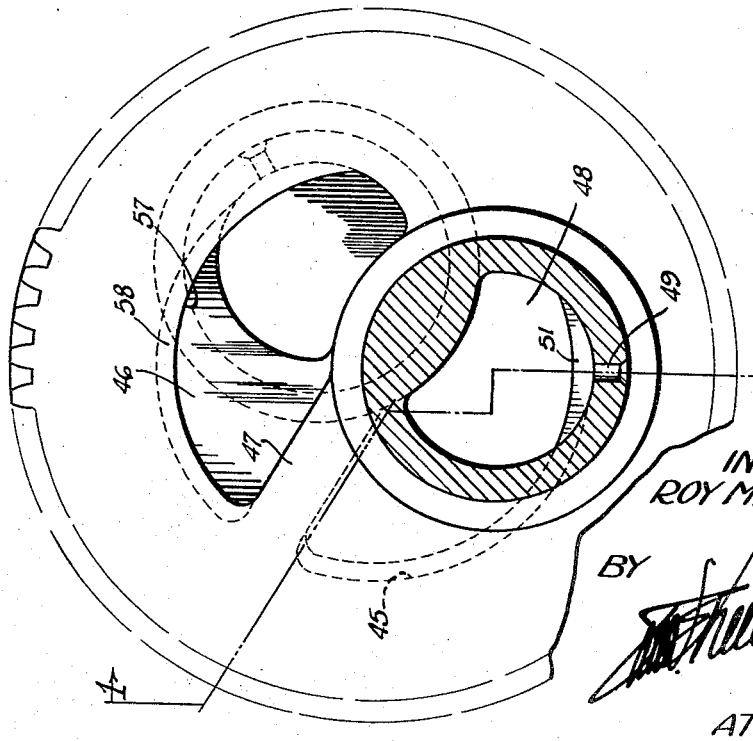

2,296,644

UNITED STATES PATENT OFFICE 2,296,644

CRANKSHAFT OILING SYSTEM

Roy M. Magnuson, Campbell, Calif., assignor to Food Machinery Corporation, San Jose, Calif., a corporation of Delaware Application April 28, 1941, Serial No. 390,720

2 Claims. (Cl. 184—6)

This invention relates to the art of high pressure reciprocating hydraulic pumps and has particular reference to the lubrication of the crank shafts of such pumps.

These shafts are subjected to extremely heavy duty and difficulty is experienced, particularly if the pumps are to be run at considerable speeds, in providing for adequate and reliable lubrication of the crank pins and the connecting rod bearings journalled thereon, without resorting to the use of relatively complicated and expensive mechanism.

It is one of the objects of this invention to provide a pump of the character referred to, with a simplified and reliable oiling system for the crank shaft.

It is also an object of the invention to provide a crank shaft embodying an improved oiling system therefor.

The manner of accomplishing the foregoing objects, as well as further objects and advantages, will be made manifest in the following description taken in connection with the following drawings, in which:

Fig. 1 is a longitudinal sectional view taken on the line 1—1 of Figs. 2 and 3 and illustrating a preferred embodiment of the crank shaft of the invention.

Fig. 2 is a transverse sectional view taken on the line 2—2 of Fig. 1.

Fig. 3 is a transverse sectional view taken on the line 3—3 of Fig. 1.

Fig. 4 is a transverse sectional view taken on the line 4—4 of Fig. 1.

Fig. 5 is a horizontal sectional view taken on the line 5—5 of Fig. 1.

Referring specifically to the drawings, these are seen to illustrate a high pressure reciprocating piston hydraulic pump 10 which includes a crank case 11 covered by a bottom plate 12, and having end bearing supports 13, bearings 14 being mounted in these supports.

Disposed within the crank case 11 is a crank shaft 20 which is formed integrally of a single piece of metal and includes trunnions 21 and 22 which extend into and are journalled in the bearings 14.

Disposed between the trunnions 21 and 22 and integrally embodied with these trunnions to form the crank shaft 20 is a crank pin formed by the eccentric disc 23, a disc-shaped crank arm 24 in the form of a gear wheel, a crank pin 25 similar to the crank pin 23, a second gear wheel shaped crank arm 26, and a crank pin 27 similar to the others. Though not shown in the drawings, a suitable drive shaft is journalled in the crank case 11, this shaft having pinions which mesh with the gears 24 and 26 so as to transmit rotation to the crank shaft. Fitted upon the crank pins 23, 25, and 27 are connecting rods 28, 29, and 30. These connecting rods connect with and operate the usual pistons provided in this type of pump.

The crank shaft 20 is preferably formed by casting and is cored out to produce the following lubricating oil chambers:

Gear wheel 24 has oil chamber 35, this chamber having a sector-shaped mouth 36, the outer edge of which is concentric to the axis of the trunnions 21 and 22 and has extending inwardly therefrom a lip 38. Connecting with one end of the chamber 35 is a cavity 39 which extends axially into the crank pin 23. Cavity 39 effects a hollowing out of a large part of the metal in the interior of the crank pin 23, and communicates through an oil port 40 with the exterior surface of this crank pin.

Gear wheel 26 is cored out to provide two chambers 45 and 46, these being separated centrally by a diametral wall 47 (see Figs. 2 and 4). The chamber 45 connects with a cavity 48 which extends into and eliminates a considerable portion of the metal within the crank pin 27, this cavity being connected with the exterior bearing surface of this crank pin by an oil port 49. The chamber 45 has a sector-shaped mouth 50, the outer edge of which is provided with a lip 51 which is concentric with the axis of the crank shaft.

The oil chamber 46 (see Figs. 1, 2, and 4) communicates with an oil cavity 55 which is formed by coring out a major portion of the metal within the crank pin 25, this cavity being connected with the outer bearing surface of this crank pin by an oil port 56. The chamber 46 has a sector-shaped mouth 57, the outer edge of which is provided with a lip 58 which is concentric with the axis of the crank shaft 20.

The crank shaft of my invention operates to lubricate the several crank pins 23, 25, and 27 thereof, and the bearings of the connecting rods journalled thereon, in the following manner:

The sump in the crank case 11 is maintained filled with a body of oil 60 substantially up to the level indicated in Fig. 1. As the crank shaft 20 rotates, the outer lips 38, 51, and 58 respectively of the oil receiving chambers 35, 45, and 46 are submerged below the level of the oil 60 so that this oil flows over these lips into the respective oil chambers and is transmitted from the latter into the cavities 39, 48, and 55 respectively of these crank pins. As the shaft rotates, the centrifugal force throws the oil outwardly against the walls of the oil chambers and cavities so as to forcibly eject the oil out through the ports 40, 56, and 49 to the wear surfaces of these crank pins, while at the same time the lips 38, 51 and 58 serve to prevent a substantial portion of the oil from being thrown back into the crank case, so that a substantially continuous force feed of oil to the crank pins is obtained.

From the foregoing description, it is to be noted that I have produced, by coring out the casting from which the crank shaft 20 is made, a relatively light and strong structure which provides, with a very small amount of machine work, a separate lubricating system for each of the crank pins of the shaft. It is to be noted that I have provided two such lubricating systems in a single gear wheel 26, and while coring out a considerable portion of the metal within this gear wheel and within the crank pins adjacent thereto have produced a structure which is adequately reenforced internally against the excessive stresses which the shaft must bear by the separation of the chambers 45 and 46 by the diametral wall 47.

It is also to be noted that I have provided large concentric sector-shaped mouths for the oil receiving chamber of each of the lubricating systems of the invention so that even at high speeds, or when the oil level is relatively low, ample opportunity is given for a very considerable flow of oil over the concentric lips in each of these mouths during each revolution of the shaft 20.

This insures the entry of an adequate amount of oil into each of these chambers and the transfer of this oil to the cavity connected therewith and extending into the crank pin lubricated thereby.

I claim:

1. In a pump having a crank case embodying an oil sump, and a crank shaft having a crank pin and a crank arm, said crank shaft being mounted in said crank case so that the crank arm dips into the oil in said sump as the crank revolves, the combination of: an oil cavity within said crank pin and communicating exteriorly of the crank shaft through an opening in the crank arm, an oil passage extending from said cavity to the bearing surface of said crank pin, and a lip in said opening to retain oil therein as the opening ascends during rotation of the crank shaft.

2. In a pump having a crank case embodying an oil sump, and a crank shaft having a crank pin and a crank arm, said crank shaft being mounted in said crank case so that the crank arm dips into oil in said sump as the crank revolves, the combination of: an oil cavity within said crank pin and communicating exteriorly of the crank shaft through an opening formed in the crank arm for movement below the oil level in said sump as the crank revolves and an oil passage extending from said cavity to the bearing surface of said crank pin to conduct to said bearing surface oil which has flowed by gravity into said opening while the latter is disposed below the oil level in said sump.

ROY M. MAGNUSON.